Patented Oct. 3, 1939

2,174,527

UNITED STATES PATENT OFFICE 2,174,527

POLYAMIDES

Wesley Rasmus Peterson, Wilmington, Del., assignor to E. I. du Pont de Nemours & Company, Wilmington, Del., a corporation of Delaware No Drawing. Application June 5, 1936, Serial No. 83,809

13 Claims. (Cl. 260—78)

This invention relates to polymeric materials, and more particularly to improvements in the preparation of polyamides and to the products thus produced.

In Patents 2,071,250 and 2,071,253, and in application Serial No. 74,811 filed April 16, 1936, by W. H. Carothers are disclosed high molecular weight polyamides which are capable of being formed into useful fibers. These fiber-forming polyamides are referred to as superpolyamides. They are made by heating amino acids, or by heating diamines with dibasic carboxylic acids under conditions causing amide formation. Linear condensation occurs with the formation of polyamides.

In the case of diamines and dibasic carboxylic acids (which in this specification and in the claims includes dicarboxylic acids and amide-forming derivatives of dibasic carboxylic acids) the reaction may be represented as follows:

in which G and G' represent divalent organic radicals and $x$ represents an indefinite large number. If suitable reactants are selected and the polymerization proceeds far enough, as shown in the previously mentioned applications, polymers are formed which are capable of yielding useful fibers. It has further been shown that this fiber-forming property does not generally appear until the polymers have an intrinsic viscosity of at least 0.4. These superpolyamides appear to be crystalline and can be converted into very useful fibers, among other methods, by melt spinning, i. e., by extruding the molten polymer through small orifices, e. g., a spinneret, and then cold-drawing, that is drawing at a temperature below the melting point of the polymer or stretching the resultant filaments until they show fiber orientation. This method of spinning is obviously simpler and more economical than conventional methods of spinning from solution. However, most superpolyamides, and particularly those most useful for the preparation of textile fibers, have high melting points, often in the neighborhood of 200-300° C. At the temperatures required to spin such polymers from a melt (generally 10 to 50° C. above their melting points) these products undergo further polymerization, since they still contain terminal amide-forming groups (see Formula A). This fact is also true of polyamides derived from amino acids. This further polymerization makes it difficult to prepare uniform filaments from the polymer, for when a sample of the latter is heated in a melt spinning device, the filaments first extruded consist of a lower molecular weight polymer than those extruded near the end of the spinning operation. Moreover, in order to obtain filaments of uniform denier throughout the spinning operation, it is necessary to increase the temperature and/or the pressure of the molten polymer as the polymer mass becomes more viscous. In order to overcome this difficulty it has been proposed in the mentioned application Serial Number 74,811 to use a small excess (up to 5 molar per cent) of either the diamine or the dibasic carboxylic acid in the preparation of the polyamide. This gives a polymer whose terminal groups are essentially all amino or all carboxyl groups depending upon whether the diamine or the dibasic carboxylic acid was used in excess. For example, the formula of a polymer prepared with excess dibasic carboxylic acid may be represented as follows:

These polymers, which are essentially viscosity stable, are claimed in application Serial Number 136,031, filed April 9, 1937.

An object of this invention is to prepare polyamides which do not undergo further reaction when heated under polymerizing conditions. A further object is to prepare polyamides which do not undergo appreciable viscosity change when heated at their melting point. A still further object is to prepare polyamides which can be spun into fibers from melt without undergoing substantial change in viscosity. Other objects will appear hereinafter.

These objects are accomplished by heating polyamide-forming reactants, particularly diamine-dibasic carboxylic acid mixtures, in the presence of monofunctional amide-forming compounds which includes their derivatives capable of yielding these compounds and functioning as such under the conditions of the reaction. These monofunctional compounds may be monobasic organic acids and monofunctional nitrogenous bases which contain at least one hydrogen atom attached to the nitrogen atom. The nitrogenous bases include ammonia, monoamines (i. e., compounds containing a single amide-forming amine group) and compounds capable of yielding ammonia or monoamines under the conditions of the reaction. The term polyamide-forming reactant is used to designate a bifunctional compound which yields a polyamide when heated alone or in admixture with a complementary polyamide-forming reactant. It includes polymerizable amino acids or amide-forming derivatives thereof (i. e., an ester, acid halide, amide, or anhydride), diamines, dicarboxylic acids, and amide-forming derivatives of dibasic carboxylic acids. In contrast to the polyamide-forming reactants, the monofunctional amide-forming reactants are not capable of yielding polymers.

I have found that viscosity stable polyamides of improved properties can be made by preparing polyamides in the presence of a small amount, generally 0.1-5 molar per cent, of a monofunctional compound such as described above. These substances which are added to impart viscosity stability to the polyamide will be referred to as the "stabilizer". In the preparation of polyamides in the presence of a stabilizer, the viscosity of the polymer increases progressively, approaches a maximum, and then remains substantially constant. The ultimate viscosity of the polyamide obtained is dependent upon the amount of stabilizer added; the more stabilizer that is added the lower the ultimate viscosity. When the reaction with the stabilizer is complete, however, the resultant product is essentially viscosity stable, i. e., its viscosity is not altered appreciably by further heating under polymerizing conditions or at the temperatures required for spinning the polymer from melt. The stabilizer may be added to the polyamide-forming reactants before, during, or after polymerization. A stabilizer may also be added to (heated with) a preformed polymer to lower its viscosity.

As already indicated, the reaction of equivalent amounts of diamine and dibasic carboxylic acid yields a polymer having the structure represented by Formula A. Polymers of this type are capable of undergoing further reaction when heated in the molten state, since they contain reactive terminal amino and carboxyl groups. If a monofunctional acid (ACOOH, in which A is an alkyl radical) is used in conjunction with the diamine and dibasic carboxylic acid, the ultimate product may be represented as follows:

ACONHGNH(COG'CONHGNH)$_x$
COG'COOH   (C)

When a monofunctional nitrogenous base (e. g., A'NH$_2$ in which A' is an alkyl radical) is used in conjunction with the diamine and dibasic carboxylic acid, the products formed may be represented as follows:

NH$_2$GNH(COG'CONHGNH)$_x$COG'CONHA'   (D)

Products of types C and D cannot undergo further polymerization and are accordingly viscosity stable. They differ from the products of type B in that one of the terminal groups in the polymer is an alkyl group.

It is desirable to prepare polyamides in which both the terminal groups of the polymer molecule are hydrocarbon in character (i. e., alkyl, alicyclic, aromatic, or araliphatic groups), since such groups are stable and non-reactive. It has been found that such products can be prepared by adding to the diamine-dibasic carboxylic acid mixture: (a) a small excess of diamine plus an equivalent amount of monobasic acid (essentially a diamine-monobasic acid salt), (b) a small excess of dibasic acid plus an equivalent amount of mono-functional nitrogenous base (essentially a monoamine-dibasic acid salt), or (c) a small amount of monofunctional nitrogenous base, particularly a monoamine plus an equivalent amount of monobasic carboxylic acid (essentially a monoamine-monobasic acid salt). Products obtained in this way are greatly superior in thermal stability to those of type A and B, at least they do not develop gaseous decomposition products (bubbles) so readily under melt spinning conditions. They are also superior to products of type C and D in this respect. Polyamides prepared by method (a), i. e., reacting a diamine and a dibasic carboxylic acid in the presence of a small amount of a diamine-monobasic acid salt, generally less than 0.05 and preferably from 0.01 to 0.03 chemical (molar) equivalents on the basis of the diamine-dibasic carboxylic acid mixture (salt), are particularly desirable products from the standpoint of viscosity. The formation of such products is illustrated in the following equation:

$x$NH$_2$GNH$_2$+$x$HOOCG'COOH+
NH$_2$GNH$_2$.2ACOOH→(2$x$+2)H$_2$O+
ACONHGNH(COG'CONHGNH)$_x$COA   (E)

It will be noted that the terminal groups in the polyamide molecules (E) thus formed are hydrocarbon in character.

Viscosity stable polyamides can also be prepared by heating preformed polyamides with a stabilizer. Ammonia is especially useful as a stabilizer in this connection. This method of applying ammonia consists essentially in passing ammonia through hot preformed polyamide, generally a polymer of fairly high intrinsic viscosity, in the molten state or in solution. Treatment with ammonia is continued until a product of the desired intrinsic viscosity is obtained. The resultant polyamide is essentially viscosity stable.

It has been stated that the quantity of stabilizer employed in the preparation of the products of this invention determines the ultimate viscosity of the product. Quantities of stabilizer from 0.1 to 5.0, and preferably from 1.0 to 3.0, molar per cent of the diamine (or dibasic acid) are usually used in the preparation of viscosity stable polyamides described herein. In case the preformed polyamide is treated the above percentages refer to the molar per cent of the diamine represented or chemically combined in the polyamide. By a mol of diamine-dibasic carboxylic acid salt is meant the quantity of salt obtained from one mol of diamine and one mol of dibasic carboxylic acid. More than 0.05 mol of stabilizer may be used, however, when it is desired to prepare products of low viscosity. For the preparation of fiber-forming polyamides it is generally desirable to have the ultimate intrinsic viscosity of the polyamide in the range from 0.5 to 2.0. The quantity of stabilizer required to obtain a product of a given intrinsic viscosity can be determined by experiment. When the quantity and conditions for the preparation of a given product have been determined, the results can be duplicated fairly readily. The quantity of stabilizer necessary to prepare a product of a given intrinsic viscosity [$\eta$] can also be determined, roughly at least, by the following equation:

Mols stabilizer required=
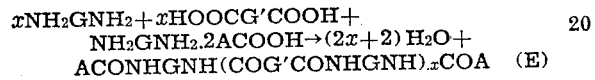

in which "salt" refers to the diamine-dibasic carboxylic acid salt or to the mixture of polyamide-forming reactants used.

While the invention has been described with special reference to the preparation of viscosity stable polyamides of the diamine-dibasic carboxylic acid type, it is also applicable to the preparation of polyamides from amino acids whose amino nitrogen carries at least one hydrogen atom. It is possible, for example, to prepare viscosity stable polyamides by heating a polymerizable amino acid or an amide-forming derivative thereof in the presence of a monofunctional acid, a monofunctional nitrogenous base, or a derivative which is capable of functioning as such an acid or base under the conditions of the reaction.

The following examples, in which the parts are given by weight, are illustrative of this invention:

Example I

Chemically equivalent amounts of pentamethylenediamine and sebacic acid (1 mol of each) were heated with 300 parts of mixed xylenol (B. P. 218–220° C.) in a vessel provided with a means for returning solvent lost by distillation, a means for introducing nitrogen, a thermometer, and a viscometer for measuring the absolute viscosity of the mixture. The mixture was heated for 3.5 hours by means of the vapors of boiling naphthalene (B. P. 218° C.). A stream of nitrogen was passed through the reaction mixture throughout the polymerization. The absolute viscosity of the mixture (measured at 218° C.) at this point was 2.6 poises and the intrinsic viscosity of the polymer, as determined from a test portion, was 0.76. The mixture was then cooled, 0.02 mol of lauric acid was added, and the heating continued at 218° C. After two hours' heating, the absolute viscosity of the solution, measured at 218° C., was 3.7 poises and after five hours it was still 3.7 poises, indicating that no further polymerization was taking place. The warm mixture was then poured into a large volume of alcohol. This caused the polymer to separate out as a fine white powder which was filtered off, washed with hot alcohol, and dried. The product, essentially polypentamethylene sebacamide, had an intrinsic viscosity of 0.8 and melted at 192° C. At 218° C. the molten polymer (free from solvent) had an absolute viscosity of 240 poises which increased only slightly on heating for three hours at 218° C., whereas a similar polymer which had not been stabilized showed a four-fold increase in absolute viscosity after heating for three hours at 218° C. The stabilized polymer was readily spun from melt at 217° C. Typical filaments obtained in this way and cold-drawn 155% had a tenacity at break of 3.66 g. per denier.

Example II

A mixture of 252 parts (approximately 1 mol) of hexamethylene diammonium adipate (salt derived from hexamethylenediamine and adipic acid), 4.72 parts (0.02 mol) of hexamethylene diammonium acetate (salt derived from hexamethylenediamine and acetic acid), and 500 parts of o-hydroxydiphenyl were heated at 260–270° C. for seven hours in a vessel provided with a steam heated reflux condenser, which permitted only the water to escape from the reaction, and an inlet into which nitrogen was slowly introduced. The modified superpolyamide thus formed was precipitated from solution by pouring the reaction mixture into a large volume of alcohol. The product had an intrinsic viscosity of 0.62. It did not change in viscosity when heated at the temperature required for melt spinning and had excellent spinning characteristics. Filaments were spun from melt at 285° C. under a 50-lb. pressure through a spinneret having ten orifices each 0.0078" in diameter and placed at the bottom of ⅛" cone-shaped protrusions extending downward from the face of the spinneret. The filaments were collected on a motor-driven drum having a peripheral speed of 340 feet per minute (spinning rate) and continuously transferred to and collected on a second drum, having a peripheral speed of 600 feet per minute (drawing rate), equivalent to approximately 100% stretching or cold-drawing. A 75 g. batch of polymer was spun in this way during the course of 45 minutes without any apparent decomposition or bubbling and without any appreciable change in the intrinsic viscosity of the polymer. The filaments were lustrous, silky, and had the following properties: denier at break, 4.3; tensile strength at break, 5.2 g. per denier which is equivalent to 50.5 kg. per sq. mm. The elastic recovery of these fibers under moderate elongations or stresses was very remarkable; the recovery was much superior to that of silk and existing artificial silks.

Example III

Seventy parts (0.22 mol) of decamethylenediamine-adipic acid salt and 70 parts of xylenol were heated together for six hours at 218° C. under the conditions described in Example I. The viscosity of the solution at this point was 40 poises, corresponding to an estimated intrinsic viscosity for the polymer of approximately 1.2. To this solution was then added with thorough stirring 0.93 part (0.007 mol) of phenyl acetate, which was estimated to lower the intrinsic viscosity of the polymer to 0.6. The viscosity of the solution decreased rapidly and became constant at 4.6 poises after 40 minutes of additional heating. The resultant polyamide was precipitated by means of alcohol, filtered, washed with boiling alcohol, and dried. It had an intrinsic viscosity of 0.62 and a melting point of 230° C. It was readily spun from melt without undergoing any appreciable change in viscosity. Typical fibers prepared by spinning from melt at 240–250° C. under 25-lb. pressure at a spinning rate of approximately 400 ft./min. and a drawing rate of 945 ft./min. had a denier at break of 2.8 and a tensile strength at break of 3.3 g./per denier.

Example IV

A solution of 300 parts of hexamethylene diammonium adipate and 2.35 parts of adipic acid in 300 parts of anhydrous phenol was heated for 24 hours at 208–215° C. in an apparatus similar to that described in Example II. This gave a superpolyamide having an intrinsic viscosity of approximately 1.0. The reaction mixture was then diluted with about 200 parts phenol and treated with an excess of ammonia one hour at 208–215° C. This was done by bubbling a stream of anhydrous ammonia through the hot reaction mixture. The modified superpolyamide was then precipitated by pouring into a mixture of alcohol and ethyl acetate, was thoroughly washed with boiling alcohol, and dried. It had a melting point of 248° C. and an intrinsic viscosity of 0.67. The viscosity of the product was substantially unaltered by heating for three hours at 288° C. The product was also superior to unstabilized polymer in thermal stability; no bubbles occurred even on heating for one hour under 50-lbs. pressure at 288° C., whereas unstabilized polymer usually develops bubbles when heated for one-half hour under these conditions. These properties make this superpolyamide especially adapted to melt spinning. On spinning from melt at 285° C. under 50-lbs. pressure at a spinning rate of 655 ft./mm. and a drawing rate of 1053 ft./min. fibers were obtained having a denier of 2.65, a denier at break of 1.08, and a tensile strength at break of 7.5 g./per denier. These fibers were then further cold-drawn and plied into a 70-filament, 159 denier yarn. This yarn was then drawn to increase the total cold-drawing (stretching), including the previous drawing to 300% (4 times length of original filament). The fibers were then given four twists to the inch. The yarn so obtained had a dry tenacity of 3.6 g. per denier based on the original denier of 113.4 and an elongation of 20% as determined on the inclined plane tester. (Scott, Am. Dyestuff Reporter 24, 120 (1935).)

*Example V*

One mol of hexamethylene diammonium adipate and 0.02 mol of adipamide were heated together for two hours at 280° C. under 80 lbs. of nitrogen pressure and then for three hours at the same temperature under atmospheric pressure. The modified polyamide thus formed was viscosity stable and yielded fibers of good quality.

*Example VI*

A mixture of two mols of hexamethylene diammonium adipate and 0.02 mol of hexamethylene diammonium acetate was placed in a two-liter, silver-lined autoclave equipped with an 18:8 stainless steel (i. e., 18% chromium, 8% nickel, and less than 0.7% carbon) stirrer and an 18:8 stainless steel steam-cooled reflux condenser, the top of which was connected through a water-cooled downward condenser to a receiver. Air was removed from the autoclave by evacuation, followed by filling with nitrogen and evacuating again. A nitrogen pressure of 80 pounds was then applied. The nitrogen used for this purpose was commercial nitrogen which had been washed with sodium hydrosulfite "silver salt" solution to remove substantially the last traces of oxygen. The stirrer was started and the autoclave heated to 288° C. during 1.5 hours. The pressure was then reduced to atmospheric during 0.5 hour and the heating and stirring continued for 2.5 hours. After cooling the polymer was removed from the autoclave as a white solid cake. It had an intrinsic viscosity of about 0.9 and yielded good fibers on spinning from melt using a constant volume delivery pump of the type used in viscose spinning (Zenith gear pump, Type A-1).

Polyamides of this invention can be prepared by the general methods described in the previously mentioned applications. Thus, it is possible to prepare the products of this invention by reacting polyamide-forming reagents with a viscosity stabilizer in the absence of a solvent (fusion method), in the presence of an inert solvent such as a monohydric phenol, or in the presence of an inert non-solvent such as a hydrocarbon or inert chlorinated hydrocarbon. Mixtures of solvents and non-solvents may also be used. The reaction is generally carried out in the neighborhood of 150–300° C. and preferably 220–290° C. The reaction may be effected at ordinary, increased, or decreased pressure. Often it is desirable, especially in the last stage of the reaction, to employ conditions, e. g., reduced pressure, which will aid in the escape of the water or other by-products formed in the reaction.

To prepare polyamides of the diamine-dibasic carboxylic acid type, it is advantageous to use the diamine-dibasic carboxylic acid salt, since this product is crystalline and easily obtained in a pure form. However, the diamine may be reacted directly with a dicarboxylic acid or an amide-forming derivative of a dibasic carboxylic acid such as the ester, acid chloride, amide, or anhydride. The invention, as already indicated, is applicable to the preparation of viscosity stable amino acid polymers. The preparation of viscosity stable interpolymers, for example, those obtained by reacting an amino acid with a diamine-dibasic carboxylic acid mixture or a mixture of diamine-dibasic dicarboxylic acid salts, is also within the scope of this invention.

The examples illustrate the use of various monofunctional acids and nitrogenous bases, or derivatives capable of functioning as such reagents under the conditions of the reaction. As already stated, the viscosity stabilizers are monofunctional amide-forming derivatives. They may also be described as monofunctional salt-forming compounds of the class consisting of monobasic organic acids, monofunctional nitrogenous bases containing at least one hydrogen atom on the nitrogen atom, and derivatives of such acids and bases. As additional examples of viscosity stabilizers within the scope of this invention might be mentioned monofunctional acids, such as acetic, propionic, stearic, benzoic; anhydrides of monofunctional acids; esters of monofunctional acids, particularly aryl esters such as cresyl acetate, phenyl propionate; salts of monofunctional acids with nitrogenous bases, such as ammonium butyrate, ammonium stearate, dibutyl ammonium acetate, pentamethylene diammonium acetate, hexamethylene diammonium propionate; ammonia and derivatives capable of yielding ammonia, such as urea; salts of ammonia, such as diammonium adipate, diammonium sebacate; acid amides, such as butyramide, benzamide, adipamide; monoamines, such as methylamine, dimethylamine, ethylamine, butylamine and cyclohexylamine; compounds containing a single amide-forming amino group, such as diethyl ethylenediamine $(C_2H_5)_2NCH_2CH_2NH_2$ and salts or amides derived from monofunctional nitrogenous bases and acids, such as dimethyl diammonium adipate, diethyl diammonium sebacate, di-N-methyl adipamide, di-N-methyl sebacamide, and di-N-ethyl suberamide. Mixtures of stabilizers may also be used. As illustrated in Example IV, it is also possible to apply the stabilizers to polyamides prepared with an excess of diamine or dibasic carboxylic acid.

The diamines used in the practice of this invention are those whose amino nitrogens carry at least one hydrogen. The invention herein described in very useful in the preparation of viscosity stable superpolyamides from diamines of the formula $H_2NCH_2RCH_2NH_2$ and dicarboxylic acids of the formula $HOOCCH_2R'CH_2COOH$ in which R and R' represent divalent hydrocarbon radicals free from non-benzenoid unsaturation, that is, they are free from aliphatic (olefinic or acetylenic) unsaturation, and in which R has a chain length of at least two carbon atoms. It is especially useful when applied to the preparation of superpolyamides of the above type in which R is $(CH_2)_x$ and R' is $(CH_2)_y$ in which $x$ and $y$ are integers and $x$ is at least two. These products are easily obtained in the superpolymeric or fiber-forming state and are readily spun into filaments which can be cold-drawn with especial facility to fibers of excellent quality.

While this invention is particularly applicable in the preparation of polyamides suitable for melt spinning, this by no means limits the extent or utility of the present invention. Viscosity stable fiber-forming polyamides are also useful in spinning from solution and in other applications, for example, in the preparation of films, ribbons, bands, sheets, bristles, molded articles, and the like. Non-fiber-forming polyamides, e. g., resinous polyamides, can also be obtained in the viscosity stable form by the methods of the present invention. Such products are particularly useful in the preparation of coating, molding, sizing, impregnating, adhesive, and related compositions. It is within the scope of this invention to mix viscosity stable polyamides with each other as well as with other ingredients, such as cellulose derivatives, e. g., ethyl cellulose, benzyl cellulose, celulose acetate, nitrocellulose; natural resins; synthetic resins, e. g., polyhydric alcohol-polybasic acid resins, vinyl resins, phenol-formaldehyde resins, urea-formaldehyde resins, polyamides, etc.; oils, e. g., drying oils; plasticizers; pigments; fillers; dyes; etc.

It will be seen from the foregoing description that I have developed a useful and valuable method for preparing viscosity stable polyamides which do not undergo further polymerization during the spinning operation and which, therefore, yield films of markedly greater uniformity in physical properties than those attained by the methods practiced hitherto. They also have a better affinity for certain classes of dyes. While unstabilized polyamides, and particularly fibers therefrom, generally have a strong affinity for dyes and can be dyed rapidly and permanently with the dyes ordinarily used for wool and silk, I have found that my acid stabilized polyamides take up basic dyes more readily than do unstabilized polyamides or basic stabilized polymers. On the other hand, the basic stabilized polyamides show a greater affinity for direct dyes. Polyamides stabilized with hexamethylene diammonium acetate dye well with both direct and acid colors. I have found that in general dyes are taken up more readily by polyamides than by wool or cotton and that the dyeings are faster to light and washing than corresponding wool or cotton dyeings.

As many apparently widely different embodiments of this invention may be made without departing from the spirit and scope thereof, it is to be understood that I do not limit myself to the specific embodiments thereof except as defined in the appended claims.

I claim:

1. A process for making fiber-forming substantially viscosity stable polyamides which comprises heating a mixture of polyamide-forming reactants consisting essentially of a diamine of the formula H₂NCH₂RCH₂NH₂ and a compound of the class consisting of dicarboxylic acids of the formula HOOCCH₂R′CH₂COOH and amide-forming derivatives of such acids in the presence of a viscosity stabilizing agent of the class consisting of monofunctional amide-forming compounds and their derivatives capable of functioning as such under the condition of the reaction, said monofunctional compounds being selected from the group consisting of monofunctional carboxylic acids and monofunctional nitrogenous bases, R and R′ in said formulae being divalent hydrocarbon radicals free from aliphatic unsaturation and R having a chain length of at least two carbon atoms.

2. The process set forth in claim 1 in which the diamine is hexamethylenediamine and the dicarboxylic acid is adipic acid.

3. A substantially viscosity stable fiber-forming polymer comprising the reaction product of substantially chemically equivalent amounts of hexamethylenediamine and a compound of the class consisting of adipic acid and amide-forming derivatives of adipic acid in the presence of 0.1 to 5.0 molar per cent, based on the diamine, of a viscosity stabilizing agent of the class consisting of monofunctional amide-forming compounds and their derivatives capable of functioning as such under the condition of the reaction, said monofunctional compounds being selected from the group consisting of monofunctional carboxylic acids and monofunctional nitrogenous bases.

4. A process for making fiber-forming substantially viscosity stable polyamides which comprises heating at 150–300° C. a salt derived from polyamide-forming reactants consisting essentially of a diamine of formula NH₂CH₂RCH₂NH₂ and a dicarboxylic acid of formula

HOOCCH₂R′CH₂COOH wherein R and R′ are divalent hydrocarbon radicals free from aliphatic unsaturation and in which R has a chain length of at least two carbon atoms, in the presence of a viscosity stabilizing agent of the class consisting of monofunctional amide-forming compounds and their derivatives capable of functioning as such under the conditions of the reaction, said monofunctional compounds being selected from the group consisting of monofunctional carboxylic acids and monofunctional nitrogenous bases.

5. A synthetic filament formed from a substantially viscosity stable fiber-forming polymer comprising the reaction product of a substance of the class consisting of polyhexamethylene adipamide and reactants producing said polymeric amide with 0.1 to 5.0 molar per cent, based on the diamine, of a viscosity stabilizing agent of the class consisting of monofunctional amide-forming compounds and their derivatives capable of functioning as such under the condition of the reaction, said monofunctional compounds being selected from the group consisting of monofunctional carboxylic acids and monofunctional nitrogenous bases.

6. A substantially viscosity-stable fiber-forming polymer comprising the product obtained by reacting in the presence of a viscosity stabilizing agent substantially equimolecular proportions of a diamine of the formula NH₂CH₂RCH₂NH₂ and a dibasic carboxylic acid of the formula HOOCCH₂R′CH₂COOH, R and R′ in said formulae being divalent hydrocarbon radicals free from aliphatic unsaturation and R having a chain length of at least two carbon atoms, said stabilizing agent being one which acts chemically with said reactants through monofunctional amide formation, said stabilizing agent being present in amount of 0.1 to 5.0 molar per cent of the diamine.

7. A process for making substantially viscosity stable fiber-forming polyamides capable of being formed into filaments exhibiting upon X-ray examination molecular orientation along the fiber axis, said process comprising heating under polymerizing conditions substantially equimolecular proportions of bifunctional reactants capable of yielding a fiber-forming polymer, said reactants comprising a dibasic carboxylic acid and an organic diamine, whose amino nitrogens each carries at least one hydrogen atom, in the presence of 0.1 to 5.0 molar per cent, based on the diamine, of a viscosity stabilizing agent of the class consisting of monofunctional amide-forming compounds and their derivatives capable of functioning as such under the conditions of the reaction, and continuing the polymerizing heat treatment until the polymer obtained is capable of being formed into filaments which can be cold drawn into fibers showing by characteristic X-ray patterns orientation along the fiber axis, said monofunctional compounds being selected from the group consisting of monofunctional carboxylic acids and monofunctional nitrogenous bases.

8. A process for preparing fiber-forming polymers having improved melt-spinning characteristics which comprises heating substances of the class consisting of synthetic polyamides capable of being formed into fibers showing by characteristic X-ray patterns orientation along the fiber axis, and reactants producing said polyamides, with an agent which acts chemically with said substances through monofunctional amide-formation, said agent being used in amount ranging from 0.1 to 5.0 molar per cent of the monomeric reactants represented in said polyamides.

9. A process for preparing substantially viscosity-stable fiber-forming polymers which comprises reacting with heat treatment substances of the class consisting of synthetic polyamides capable of being formed into fibers showing by characteristic X-ray patterns orientation along the fiber axis, and reactants producing said polyamides, with a viscosity stabilizing agent of the class consisting of monofunctional amide-forming compounds and their derivatives capable of functioning as such under the conditions of the reaction, said monofunctional compounds being selected from the group consisting of monofunctional carboxylic acids and monofunctional nitrogenous bases, said agent being used in amount ranging from 0.1 to 5.0 molar per cent of the monomeric reactants represented in said polyamides.

10. The process set forth in claim 8 in which said viscosity stabilizing agent is acetic acid.

11. A substantially viscosity stable fiber-forming polymer comprising the reaction product of a substance of the class consisting of synthetic polyamides capable of being formed into fibers showing by characteristic X-ray patterns orientation along the fiber axis, and reactants producing said polyamides, with a viscosity stabilizing agent of the class consisting of monofunctional amide-forming compounds and derivatives capable of functioning as such under the conditions of the reaction, said monofunctional compounds being selected from the group consisting of monofunctional carboxylic acids and monofunctional nitrogenous bases, said agent being used in amount ranging from 0.1 to 5.0 molar per cent of the monomeric reactants represented in said polyamides.

12. A substantially viscosity stable fiber-forming polymer capable of being formed into filaments exhibiting upon X-ray examination molecular orientation along the fiber axis, said polymer comprising the reaction product of substantially equimolecular proportions of a dibasic carboxylic acid and an organic diamine, whose amino nitrogen atoms each carries at least one hydrogen atom, with 0.1 to 5.0 molar per cent, based on the diamine, of a viscosity stabilizing agent of the class consisting of monofunctional amide-forming compounds and their derivatives capable of functioning as such under the conditions of reaction, said monofunctional compounds being selected from the group consisting of monofunctional carboxylic acids and monofunctional nitrogenous bases.

13. A synthetic filament exhibiting molecular orientation upon X-ray examination, said filament being formed from a substantially viscosity-stable polymer comprising the reaction product of a substance of the class consisting of synthetic polyamides capable of being formed into fibers showing by characteristic X-ray patterns orientation along the fiber axis, and reactants producing said polyamides, with a viscosity stabilizing agent which acts chemically with said substance through monofunctional amide formation.

WESLEY RASMUS PETERSON.